United States Patent
Omote et al.

(10) Patent No.: US 7,049,257 B2
(45) Date of Patent: *May 23, 2006

(54) LOW THERMAL EXPANSION MATERIALS

(75) Inventors: Atsushi Omote, Osaka (JP); Tomoko Suzuki, Nara (JP); Masa-aki Suzuki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/885,950

(22) Filed: Jul. 8, 2004

(65) Prior Publication Data

US 2005/0032625 A1    Feb. 10, 2005

Related U.S. Application Data

(63) Continuation of application No. PCT/JP04/00149, filed on Jan. 13, 2004.

(30) Foreign Application Priority Data

Jan. 14, 2003    (JP) ............................. 2003-005694

(51) Int. Cl.
C04B 35/03 (2006.01)
C04B 35/486 (2006.01)
C04B 35/495 (2006.01)

(52) U.S. Cl. ................... 501/104; 501/108; 501/123; 501/135; 423/594.12; 423/594.13; 423/594.16

(58) Field of Classification Search ............... 501/104, 501/108, 123, 135; 423/594.12, 594.13, 423/594.16
See application file for complete search history.

(56) References Cited

U.S. PATENT DOCUMENTS

| | | | |
|---|---|---|---|
| 4,098,725 A | 7/1978 | Yamamoto | |
| 5,322,559 A | 6/1994 | Sleight | |
| 5,433,778 A | 7/1995 | Sleight | |
| 5,514,360 A | 5/1996 | Sleight et al. | |
| 5,694,503 A | 12/1997 | Fleming | |
| 5,919,720 A | 7/1999 | Sleight et al. | |
| 6,183,716 B1 | 2/2001 | Sleight et al. | |
| 6,258,743 B1 * | 7/2001 | Fleming et al. | 501/102 |
| 6,812,178 B1 * | 11/2004 | Suzuki et al. | 501/134 |
| 6,844,283 B1 * | 1/2005 | Suzuki et al. | 501/134 |

FOREIGN PATENT DOCUMENTS

| | | |
|---|---|---|
| JP | 2000-290064 A | 10/2000 |
| JP | 2001-19540 A | 1/2001 |
| JP | 2003-89572 A | 3/2003 |

OTHER PUBLICATIONS

Evans, J.S.O., et al. "Negative thermal expansion materials," Physics B 241-243 (1998), Elsevier Science B.V. pp. 311-316.

* cited by examiner

Primary Examiner—David Sample
(74) Attorney, Agent, or Firm—McDermott Will & Emery LLP

(57) ABSTRACT

It is a principal object of the present invention to provide low thermal expansion materials able to answer to the needs of various uses. The present invention relates to low thermal expansion materials constituted substantially from a crystalline body represented by a compositional formula $RM(QO_4)_3$, wherein R represents at least one selected from Zr and Hf, M represents at least one selected from Mg, Ca, Sr, Ba and Ra, and Q represents at least one selected from W and Mo.

23 Claims, 2 Drawing Sheets

X-RAY DIFFRACTION PROFILE MEASUREMENT RESULTS

THERMOMECHANICAL ANALYZER MEASUREMENT RESULTS

LOW THERMAL EXPANSION MATERIALS This application is a continuation of International Application No. PCT/JP2004/000149, filed Jan. 13, 2004.

TECHNICAL FIELD

The present invention relates to novel materials having a low thermal expansion coefficient.

BACKGROUND ART

In general, materials such as oxides, resins, glasses and metals have a positive thermal expansion coefficient. However, recently various mixed oxides that exhibit a negative thermal expansion coefficient have been reported by Evans et al.

The U.S. Patents of Evans et al. show a combination of materials having positive and negative thermal expansion coefficients. Examples in which an oxide having a negative thermal expansion coefficient is dispersed in an epoxy resin are shown in the working examples in those patents (see, for example, U.S. Pat. No. 5,322,559, U.S. Pat. No. 5,433,778, U.S. Pat. No. 5,514,360, U.S. Pat. No. 5,919,720, U.S. Pat. No. 6,183,716).

Of these materials having a negative thermal expansion coefficient, materials represented by $A^{3+}_2(M^{6+}O_4)_3$ have been reported on (J. S. O. Evans et al., "Negative thermal expansion materials", Physica B, 241–243, 1998, pp. 311–316). In that document (non-patent document), Al, Y and Sc are given as examples of $A^{3+}$, and W and Mo are given as examples of $M^{6+}$. Moreover, in that document, Evans et al. report detailed X-ray diffraction analysis results for these materials. According to that report, the mechanism for negative thermal expansion arises from M-O-M bonds. Specifically, M-O bonds expand through heat, but the M—M interatomic distance of M—M bond becomes shorter through vibration of the oxygen. As a result, a negative thermal expansion coefficient is exhibited. This is singular behavior not exhibited by conventional mixed oxides.

According to the above report, for example $Sc^{3+}_2(W^{6+}O_4)_3{}^a$ has a volumetric expansion coefficient αv of −6.5 ppm/K.

Moreover, as other mixed oxides, cordierite type materials such as "Nexcera" (product name, made by Nippon Steel Corporation) are known to exhibit a negative thermal expansion coefficient (see Japanese Unexamined Patent Publication No. 2000-290064, Japanese Unexamined Patent Publication No. 2001-19540).

However, these materials are still of limited types, and are not able to completely answer to the needs of various uses. In particular, in fields such as electronic materials and precision instruments for which low thermal expansion is required to a high degree, the development of low thermal expansion materials each suitable for a particular one of these uses is required.

DISCLOSURE OF THE INVENTION

The present invention has thus been accomplished to resolve the problems of the prior art described above, and in particular it is a principal object of the present invention to provide low thermal expansion materials able to answer to the needs of various uses.

The present invention relates to low thermal expansion materials as follows.

1. A low thermal expansion material consisting essentially of a crystalline body represented by a compositional formula $RM(QO_4)_3$, wherein R represents at least one selected from a group consisting of Zr and Hf, M represents at least one selected from a group consisting of Mg, Ca, Sr, Ba and Ra, and Q represents at least one selected from a group consisting of W and Mo.

2. The low thermal expansion material according to 1 above, wherein R represents Hf.

3. The low thermal expansion material according to 1 above, wherein R represents Zr.

4. The low thermal expansion material according to 1 above, wherein R represents a mixture of Zr and Hf.

5. The low thermal expansion material according to 1 above, wherein M represents Mg.

6. The low thermal expansion material according to 1 above, wherein M represents a mixture of Mg and at least one selected from a group consisting of Ca, Sr, Ba and Ra.

7. The low thermal expansion material according to 1 above, wherein M represents a mixture of Mg and Ca.

8. The low thermal expansion material according to 1 above, wherein Q represents W.

9. The low thermal expansion material according to 1 above, wherein Q represents Mo.

10. The low thermal expansion material according to 1 above, wherein R represents Hf, and M represents Mg.

11. The low thermal expansion material according to 10 above, wherein Q represents W.

12. The low thermal expansion material according to 1 above, wherein R represents a mixture of Zr and Hf, and M represents Mg.

13. The low thermal expansion material according to 12 above, wherein Q represents W.

14. The low thermal expansion material according to 1 above, wherein R represents Hf, and M represents a mixture of Mg and at least one selected from a group consisting of Ca, Sr, Ba and Ra.

15. The low thermal expansion material according to 14 above, wherein Q represents W.

16. The low thermal expansion material according to 14 above, wherein M represents a mixture of Mg and Ca.

17. The low thermal expansion material according to 16 above, wherein Q represents W.

18. The low thermal expansion material according to 1 above, wherein the crystal system of the crystalline body is an orthorhombic system.

19. The low thermal expansion material according to 1 above, having a thermal expansion coefficient in a range of $-3 \times 10^{-6}$/K to $+3 \times 10^{-6}$/K, excluding $0 \times 10^{-6}$/K.

20. The low thermal expansion material according to 1 above, having a negative thermal expansion coefficient.

21. The low thermal expansion material according to 20 above, having a thermal expansion coefficient of at least $-3 \times 10^{-6}$/K but less than $0 \times 10^{-6}$/K.

22. An optical jig comprising the low thermal expansion material according to 1 above.

23. A high-frequency dielectric comprising the low thermal expansion material according to 1 above.

BEST MODE FOR CARRYING OUT THE INVENTION

1. Low Thermal Expansion Materials

Figure 1:
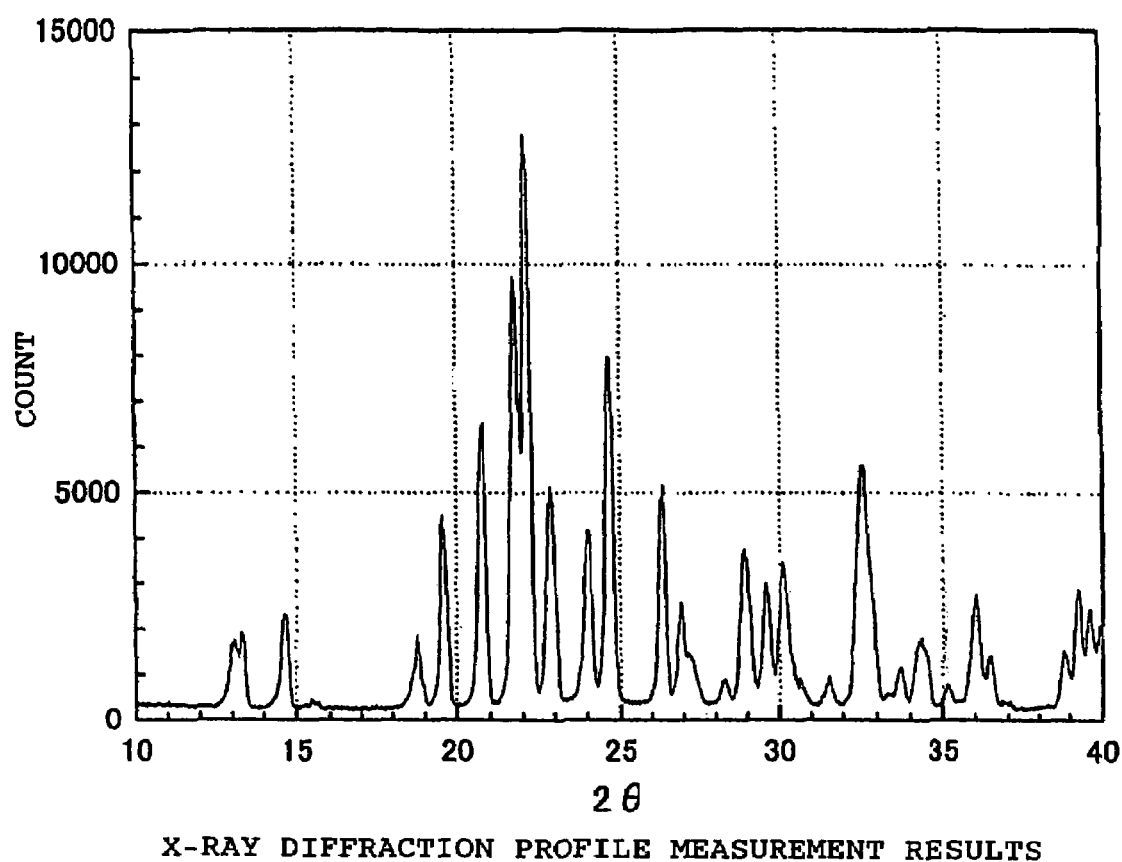
FIG. 1 is an X-ray diffraction diagram (showing X-ray diffraction profile measurement results) for a low thermal expansion material obtained in Example 1.

A low thermal expansion material of the present invention is constituted substantially from a crystalline body represented by a compositional formula $RM(QO_4)_3$, wherein R represents at least one selected from a group consisting of Zr and Hf, M represents at least one selected from a group consisting of Mg, Ca, Sr, Ba and Ra, and Q represents at least one selected from a group consisting of W and Mo.

In the above, R represents at least one tetravalent metallic element selected from Zr and Hf (i.e. R(IV)). Moreover, M represents at least one bivalent metallic element selected from Mg, Ca, Sr, Ba and Ra (i.e. M(II)). Q represents at least one hexavalent metallic element selected from W and Mo (i.e. Q(VI)). These metallic elements can be combined as appropriate in accordance with the use, method of usage and so on of the material of the present invention.

More specific examples include $ZrMg(MoO_4)_3$, $HfMg(MoO_4)_3$, $(Hf_xZr_{1-x})Mg(MoO_4)_3$ (wherein $0<x<1$), $(Hf_xZr_{1-x})Mg(WO_4)_3$ (wherein $0<x<1$), $HfMg(WO_4)_3$, and $Hf(Mg_yCa_{1-y})(WO_4)_3$ (wherein $0<y<1$).

As Q, it is preferable to select tungsten in the case that firing is carried out at a high firing temperature because tungsten sublimes at a higher temperature than Mo.

Moreover, as M, using a metallic element having a small ionic radius is preferable for obtaining a low thermal expansion material, this being based on the empirical relationship between ionic radius and negative thermal expansion coefficient. From this standpoint, it is particularly preferable to use magnesium as a bivalent metallic element.

The material of the present invention is constituted substantially from a crystalline body having a composition as above. Consequently, so long as the desired effects of the present invention are not impaired, the material may contain small amounts of amorphous material, impurities or the like. The crystalline body of the present invention is substantially polycrystalline. Moreover, it is particularly preferable for the crystal system of the crystalline body to be an ortho rhombic system. By adopting such a crystal structure, a yet better low thermal expansion characteristic can be exhibited.

The mean crystal grain size of the crystalline body according to the present invention can be set in accordance with the use, purpose and so on of the material of the present invention, but is generally preferably made to be in a range of approximately 2 to 10 μm.

The thermal expansion coefficient of the material of the present invention can be controlled precisely through the combination of R, M and Q. In general, the thermal expansion coefficient is in a range of $-3 \times 10^{-6}$/K to $+3 \times 10^{-6}$/K (excluding $0 \times 10^{-6}$/K) The thermal expansion coefficient is preferably in a range of $-2 \times 10^{-6}$/K to $+2 \times 10^{-6}$/K (excluding $0 \times 10^{-6}$/K). The thermal expansion coefficient is more preferably in a range of $-2 \times 10^{-6}$/K to $-0.01 \times 10^{-6}$/K and $+0.01 \times 10^{-6}$/K to $+2 \times 10^{-6}$/K.

The material of the present invention preferably has a negative thermal expansion coefficient. That is, the thermal expansion coefficient is preferably less than $0 \times 10^{-6}$/K. Specifically, the thermal expansion coefficient is preferably at least $-3 \times 10^{-6}$/K but less than $0 \times 10^{-6}$/K, particularly preferably at least $-2 \times 10^{-6}$/K but less than $0 \times 10^{-6}$/K, yet more preferably in a range of $-2 \times 10^{-6}$/K to $-0.01 \times 10^{-6}$/K.

Note that for the thermal expansion coefficient, the value measured using a "Thermo Plus 2/TMA" differential expansion type thermomechanical analyzer (made by Rigaku Corporation) in accordance with "Method of measuring thermal expansion of fine ceramics by thermomechanical analysis" in JIS R1681 will be taken as standard. Fused quartz was taken as the reference sample (for which the linear expansion coefficient is already known), and the measurement atmosphere was made to be atmospheric air.

The materials of the present invention can be suitably used for various uses in which a low thermal expansion characteristic is required, for example electronic materials, optical materials, magnetic materials, structural materials and the like. Specifically, the materials of the present invention can be used in optical jigs, high-frequency dielectrics and so on. More specifically, in the case of an optical jig, the material of the present invention can be used, for example, in a member that supports an optical material. Moreover, in the case of a high-frequency dielectric, the material of the present invention can be used as a dielectric for use at high frequency, for example a frequency in a range of 10 GHz to 10 THz.

2. Method of Manufacturing Low Thermal Expansion Materials

So long as a crystalline body having a composition as described above can be obtained, a material of the present invention may be manufactured using a liquid phase method, a gas phase method, or a solid phase method. For example, the following can be used: as a solid phase method, a solid phase reaction method; as a liquid phase method, a coprecipitation method, a sol-gel method, or a hydrothermal reaction method; as a gas phase method, a sputtering method, or a CVD method.

More specifically, a material of the present invention can, for example, be suitably produced using a solid phase method such as the following. In general, a mixed oxide can be manufactured by subjecting raw material metal oxides to mixed grinding or kneading using an apparatus such as a ball mill, and then carrying out calcination, coarse crushing, molding and firing in this order. Basically, a material of the present invention can also be produced using such an ordinary manufacturing method. In this case, if the particles are made sufficiently fine in the mixed grinding step, then the desired material can be manufactured without carrying out calcination.

As starting materials, elemental R, elemental M and elemental Q themselves can be used, or compounds that can act as a supply source of R, M and Q (with each compound containing at least one of R, M and Q) can be used. Examples of such compounds include oxides, hydroxides, carbonates, nitrates, chlorides, acetates, oxalates, metal alkoxides, metal acetylacetonates, metal acetates, metal methacrylates, and metal acrylates. Moreover, compound(s) each containing two or more of the elements can be used.

Compounds for R that can be used include, for example, zirconium oxide and hafnium oxide.

Compounds for M that can be used include, for example, magnesium oxide, calcium oxide, strontium oxide, magnesium hydroxide, calcium hydroxide, magnesium carbonate, and calcium carbonate.

Compounds for Q that can be used include, for example, tungsten oxide and molybdenum oxide.

Examples of compounds containing two or more of the elements include, for example, $MgWO_4$, $CaWO_4$, $SrWO_4$, $HfW_2O_8$, and $ZrW_2O_8$.

In the present invention, in addition to these starting materials, additives commonly used in the manufacture of sintered bodies (binders, sintering aids, etc.) can be used as required.

The starting materials are weighed out so that the composition of the material of the present invention will be obtained, and are then mixed together. There are no particular limitations on the mixing method, with it being possible to use a publicly known method. For example, the mixing can be suitably carried out using an apparatus capable of mixed grinding such as a mixing and grinding machine, a ball mill, a planetary mill, or a medium mill (e.g. an attriter or a vibrating mill). As the mixed grinding, wet grinding or dry grinding can be employed. The mean particle diameter of the mixed powder obtained is generally preferably controlled to be in a range of approximately 0.1 to 2 µm.

The mixed powder obtained can be calcined if required. The calcination conditions are generally made to be 650 to 1000° C. in an oxidizing atmosphere or atmospheric air. The calcination time can be set as appropriate in accordance with the calcination temperature and so on.

Next, the mixed powder is subjected to molding or forming. There are no particular limitations on the molding method, which may be, for example, any of pressing, slip casting, a doctor blade method, extrusion molding and so on. There are no particular limitations on the density of the molded body, which can be set in accordance with the use and so on of the material of the present invention.

Next, the molded body is fired. The firing temperature can be set in a range of 650 to 1300° C. as appropriate in accordance with the composition and so on of the material of the present invention. For example, 900 to 1200° C. is preferable for a tungsten composite oxide, and 700 to 1000° C. is preferable for a molybdenum oxide. If the firing temperature is too low, then the production of the oxides may not be sufficient, and hence it may not be possible to obtain the desired compound. Moreover, if the firing temperature is too high, then there is a tendency for the compound to melt, or for tungsten oxide or molybdenum oxide in the compound to sublime. The firing atmosphere is generally preferably made to be an oxidizing atmosphere or atmospheric air. The firing time can be set as appropriate in accordance with the firing temperature and so on.

According to the materials of the present invention, a desired low thermal expansion characteristic can be exhibited with any combination of the elements mentioned earlier for R, M and Q, and hence desired physical properties (dielectric properties, optical properties, mechanical strength, etc.) can be obtained while maintaining a good low thermal expansion characteristic. As a result, materials suitable for a broad range of uses can be provided.

For example, an electronic instrument or electronic component used in a high-frequency band such as the millimeter wave band has a length of the order of the wavelength. A material of the present invention can be used in such an electronic instrument or electronic component. In this case, because there is hardly any thermal expansion or contraction with the material of the present invention, an electronic instrument or electronic component which has high precision and high stability and is little affected by heat can be provided. Moreover, if a material of the present invention is used in a precision instrument used in detection or microfabrication in which precision is required to micron order, then again a precision instrument which has high precision and high stability and is little affected by heat can be provided.

Moreover, according to the present invention, the thermal expansion coefficient can be strictly controlled through the combination of elements. As a result, it becomes possible to provide a material satisfying the thermal expansion coefficient required for a particular use with improved reliability.

Specific examples of low thermal expansion materials according to the present invention are given below. Note, however, that the scope of the present invention is not limited by these examples.

EXAMPLE 1

A mixed oxide represented by $HfMg(WO_4)_3$ was manufactured.

As starting materials, $HfO_2$ (made by Kanto Kagaku, purity 99.5%), MgO (made by Kishida Chemical Co., Ltd.) and $WO_3$ (made by Kojundo Chemical Laboratory Co., Ltd., purity 4N) were weighed out in a molar ratio of 1:1:3, and wet grinding was carried out for 144 hours using a ball mill with pure water as a solvent. After that, drying was carried out for one day and night to remove the moisture, and then the mixed powder obtained was calcined at 1000 to 1100° C., thus obtaining a calcined powder.

Next, using the calcined powder, molded bodies were manufactured by pressing so as to obtain a disk-shaped sample A for X-ray diffraction analysis (size after firing: diameter 20 mm, thickness 1 mm) and a cylindrical sample B for measurement of the thermal expansion coefficient (size after firing: diameter 7 mm, height 10 mm). The samples were then fired at 1150° C. for 4 hours in atmospheric air.

X-ray diffraction analysis was carried out using sample A. The measurement results are shown in FIG. 1. Note that the analysis was carried out using a "RINT 2400" (product name, made by Rigaku Corporation). For the results shown in FIG. 1, a peak search was carried out using JCPDS cards (a collection of X-ray diffraction data). The result was that the obtained material exhibited a different structure to any of the starting materials, $HfO_2$, MgO and $WO_3$. Moreover, the material had a different structure to either $HfW_2O_8$ or $MgWO_4$, which could have been produced from these starting materials. It was thus confirmed that the material was a novel oxide not registered on the JCPDS cards.

More detailed analysis and searching was thus carried out. As a result, it was ascertained that the X-ray diffraction pattern of the material indicates the same crystal form as $Sc^{3+}_2(W^{6+}O_4)_3$ of the materials reported by Evans et al. (in the previously mentioned non-patent document), and moreover virtually the same lattice constants.

For the purpose of comparing the $Sc^{3+}_2(W^{6+}O_4)_3$ of Evans et al. and the $HfMg(WO_4)_3$ of the present invention in detail, the ionic radii of $Sc^{3+}$, $Hf^{4+}$ and $Mg^{2+}$, the lattice constants of $Sc^{3+}_2(W^{6+}O_4)_3$ (taken from the JCPDS cards), and the lattice constants of $HfMg(WO_4)_3$ as calculated from FIG. 1 are shown in Table 1.

TABLE 1

| Ion | Ionic redius (Å) |
|---|---|
| $Sc^{3+}$ | 0.75 |
| $Mg^{2+}$ | 0.72 |
| $Hf^{4+}$ | 0.71 |

TABLE 1-continued

| Material | Lattice constants (Å) | | | Notes |
|---|---|---|---|---|
| | a | b | C | |
| $Sc_2(WO_4)_3$ | 9.6 | 13.3 | 9.51 | JCPDS cards |
| $(HfMg)(WO_4)_3$ | 9.60 | 13.22 | 9.51 | Calculated from FIG. 1 |

It can be seen from Table 1 that $HfMg(WO_4)_3$ has virtually the same lattice constants as $Sc^{3+}{}_2(W^{6+}O_4)_3$. It was thus confirmed that the material of the present invention is a novel mixed oxide in which the Sc sites of the $Sc^{3+}{}_2(W^{6+}O_4)_3$ of Evans et al. have been substituted with $Hf^{4+}$ ions and $Mg^{2+}$ ions.

TEST EXAMPLE 1

Figure 2:
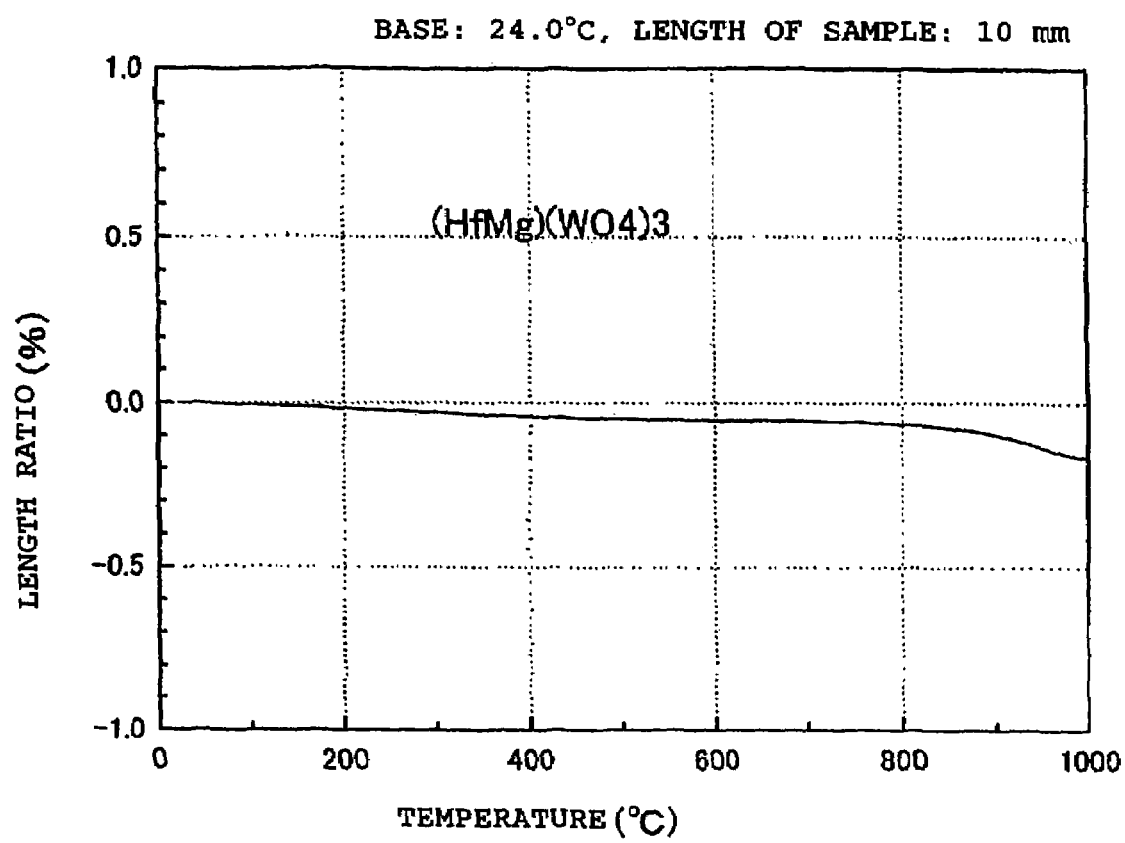
FIG. 2 is a graph showing thermal expansion coefficient measurement results for the low thermal expansion material obtained in Example 1.

The thermal expansion coefficient was measured for Sample B. The measurement was carried out using a thermomechanical analyzer (product name "Thermo Plus 2/TMA", made by Rigaku Corporation) in accordance with "Method of measuring thermal expansion of fine ceramics by thermomechanical analysis" in JIS R1681. The results are shown in FIG. 2 and Table 2. It can be seen from FIG. 2 that the material of the present invention exhibits low thermal expansion in a range approximately from room temperature to 1000° C.

The linear expansion coefficient is shown in Table 2. It can be seen from Table 2 that, taking the state at room temperature (24° C.) as a base, the material of the present invention has a low linear thermal expansion coefficient of approximately $-0.6 \times 10^{-6}$ to $-1.7 \times 10^{-6}$/K over a temperature range of 100 to 1000° C. Converting this to the volumetric expansion coefficient ($\alpha V = 3 \times \alpha L$) gives $-1.8$ to $-5.1$ ppm/K. In view of the volumetric expansion coefficient of $-6.5$ ppm/K for $Sc^{3+}{}_2(W^{6+}O_4)_3$ according to Evans et al., it can be seen that this value is highly trustworthy.

TABLE 2

Results of measurement of thermal expansion coefficient by TMA

Base: 24.0° C., length of sample: 10 mm

| Temperature (° C.) | Linear expansion ratio ΔL/L (%) | Thermal expansion coefficient × $10^{-6}$ (1/K) |
|---|---|---|
| 50 | −0.001 | −0.23 |
| 100 | −0.005 | −0.63 |
| 150 | −0.009 | −0.68 |
| 200 | −0.014 | −0.80 |
| 250 | −0.020 | −0.89 |
| 300 | −0.026 | −0.93 |
| 350 | −0.031 | −0.96 |
| 400 | −0.036 | −0.95 |
| 450 | −0.039 | −0.91 |
| 500 | −0.041 | −0.85 |
| 550 | −0.042 | −0.79 |
| 600 | −0.041 | −0.72 |
| 650 | −0.040 | −0.64 |
| 700 | −0.042 | −0.63 |
| 750 | −0.049 | −0.67 |
| 800 | −0.057 | −0.74 |
| 850 | −0.072 | −0.87 |
| 900 | −0.101 | −1.15 |
| 950 | −0.152 | −1.64 |

In Table 2, the measurement results are shown at 50° C. intervals, but it is believed that there are no sudden changes in the thermal expansion characteristic within these intervals. It is thus clear that as shown in FIG. 2, the thermal expansion coefficient will be low as with the results shown in Table 2 at all temperatures from room temperature to 1000° C.

The reason for the material of the present invention exhibiting a low thermal expansion coefficient is as follows. The material of the present invention has the same crystal structure as the materials reported by Evans et al., with there being M-O-M bonds in the crystal, and hence it is thought that the low thermal expansion characteristic is exhibited through the same mechanism as that of the analysis of Evans et al.

With the materials of the present invention, the M-O-M bonds of Evans et al. will be $R^{4+}$—O-$M^{2+}$ bonds. The materials of the present invention thus have an excellent advantage compared with the materials of Evans et al. in that, because there are many combinations of $R^{4+}$ and $M^{2+}$, the $M_1$-O-$M_2$ bonds, which could not be controlled, can be freely controlled. Consequently, with the materials of the present invention, strict control of the thermal expansion coefficient is possible, and it becomes possible to cope with the needs of uses in which various properties such as electrical properties (dielectric constant, dielectric loss, etc.) and mechanical strength are required.

TEST EXAMPLE 2

The calcined powder of $HfMg(WO_4)_3$ obtained in Example 1 was subjected to pressing to form a cylinder of diameter 7 mm and height 10 mm, and then the formed body obtained was fired at 1150° C. for 4 hours in atmospheric air. Next, the fired body was cut into a bullet shape.

The thermal expansion coefficient of the bullet-shaped body was measured. The measurement was carried out using a laser thermal expansion measurement system (product name "LIX-1M", made by Ulvac-Riko, Inc.) in accordance with "Method of measuring linear expansivity of low expansion glass by laser interference" in JIS R3251. The results are shown in Table 3. As shown in Table 3, taking the state at 50° C. as a base, the material of the present invention exhibited a low linear thermal expansion coefficient of approximately $-0.7 \times 10^{-6}$ to $+0.3 \times 10^{-6}$/K over a temperature region of approximately 100 to 700° C.

TABLE 3

Laser thermal expansion measurement system measurement results

Base: 50.0° C.,
length of sample: 8.554 mm

| Temperature (° C.) | Displacement (μm) | Linear expansion ratio ΔL/L (%) | Thermal expansion coefficient × $10^{-6}$ (1/K) |
|---|---|---|---|
| 100 | −0.235 | −0.0027 | −0.55 |
| 150 | −0.525 | −0.0061 | −0.61 |
| 200 | −0.802 | −0.0094 | −0.63 |
| 250 | −1.013 | −0.0118 | −0.59 |
| 300 | −1.152 | −0.0135 | −0.54 |
| 350 | −1.256 | −0.0147 | −0.49 |
| 400 | −1.360 | −0.0159 | −0.45 |
| 450 | −1.343 | −0.0157 | −0.39 |
| 500 | −1.121 | −0.0131 | −0.29 |
| 550 | −0.684 | −0.0080 | −0.16 |
| 600 | −0.028 | −0.0003 | −0.01 |
| 650 | +0.816 | +0.0095 | +0.16 |
| 700 | +1.637 | +0.0192 | +0.29 |

In Table 3, the measurement results are shown at 50° C. intervals, but it is believed that there are no sudden changes in the thermal expansion characteristic within these intervals. It is thus surely the case that the thermal expansion coefficient is very low as with the results shown in Table 2 at all temperatures from room temperature to 700° C.

Consequently, although the measurement method differed between Table 2 and Table 3, it can be seen that the material of the present invention exhibits a low thermal expansion coefficient over a broad temperature range.

EXAMPLES 2

HfMg(WO$_4$)$_3$ was manufactured as in Working Example 1, except that the manufacturing method was changed as described in (1) and (2) below.

(1) HfO$_2$ and WO$_3$ were reacted together to prepare HfW$_2$O$_8$, and then prescribed amounts of MgO and WO$_3$ were mixed with the HfW$_2$O$_8$ and firing was carried out, thus manufacturing HfMg(WO$_4$)$_3$.

(2) HfW$_2$O$_8$ and MgWO$_4$ were subjected to firing, thus manufacturing HfMg(WO$_4$)$_3$.

The HfMg(WO$_4$)$_3$ samples obtained were analyzed as in Example 1, whereupon it was confirmed that the HfMg (WO$_4$)$_3$ samples were a novel mixed oxide in which the Sc sites of the Sc$^{3+}{}_2$(W$^{6+}$O$_4$)$_3$ of Evans et al. have been substituted with prescribed ions.

Moreover, the thermal expansion coefficient was measured as in Test Examples 1 and 2, whereupon a thermal expansion coefficient very similar to that of the material of Example 1 was exhibited.

EXAMPLES 3

Oxides of compositional formula (Hf$_x$Zr$_{1-x}$)Mg(WO$_4$)$_3$ with x being 0, 0.25, 0.5, 0.75 or 1.0 were prepared.

As starting materials, HfO$_2$ (made by Kanto Kagaku, purity 99.5%), ZrO$_2$ (made by Daiichi Kigenso Kagaku Kogyo Co., Ltd.), MgO (made by Kishida Chemical Co., Ltd.) and WO$_3$ (made by Kojundo Chemical Laboratory Co., Ltd., purity 4N) were weighed out in a prescribed ratio, and wet grinding was carried out for 144 hours using a ball mill with pure water as a solvent. After that, drying was carried out for one day and night to remove the moisture, and then the mixed powder was calcined at 1000 to 1100° C., thus obtaining a calcined powder of each composition.

Next, using each calcined powder, a molded body was produced by pressing such that the size after firing would be diameter 7 mm×height 10 mm, and then the molded body was fired at 1150° C. for 4 hours in atmospheric air.

The fired body obtained was analyzed as in Example 1, whereupon it was confirmed that the fired body was a novel mixed oxide in which the Sc sites of the Sc$^{3+}{}_2$(W$^{6+}$O$_4$)$_3$ of Evans et al. have been substituted with prescribed ions.

Moreover, the thermal expansion coefficient of the fired body obtained was measured as in Test Example 1. The results are shown in Table 4. It can be seen from Table 4 that the thermal expansion coefficient is very low at 300° C., 500° C. and 700° C.

TABLE 4

Results of measurement by TMA
(Hf$_x$Zr$_{1-x}$)Mg(WO$_4$)$_3$ (x = 0, 0.25, 0.5, 0.75, 1.0)
Base: Temperature at start of measurement (room temperature),
length of sample: 10 mm

| Temperature (° C.) | x = 0 | 0.25 | 0.50 | 0.75 | 1.0 |
|---|---|---|---|---|---|
| | Thermal expansion coefficient ×$10^{-6}$ (1/K) | | | | |
| 300 | −1.05 | +0.11 | −0.51 | −0.82 | −0.93 |
| 500 | −0.67 | −0.05 | +0.01 | −0.23 | −0.85 |
| 700 | +0.24 | −0.48 | −0.23 | −0.41 | −0.63 |

Table 4 only shows the results of measurement at the three temperatures 300° C., 500° C. and 700° C., but analogizing from the results shown in FIG. 2, Table 2 and Table 3, it is believed that there are no sudden changes in the thermal expansion coefficient within the above temperature region. It is thus clear that the thermal expansion coefficient will be very low as with the results shown in Table 4 at all temperatures from room temperature to 700° C.

EXAMPLES 4

Oxides of compositional formula Hf(Mg$_y$Ca$_{1-y}$) (WO$_4$)$_3$ with y being 0, 0.25, 0.5, 0.75 or 1.0 were manufactured.

As starting materials, HfO$_2$ (made by Kanto Kagaku, purity 99.5%), MgO (made by Kishida Chemical Co., Ltd.), CaCO$_3$ (made by Kanto Kagaku) and WO$_3$ (made by Kojundo Chemical Laboratory Co., Ltd., purity 4N) were weighed out in a prescribed ratio, and wet grinding was carried out for 144 hours using a ball mill with pure water as a solvent. After that, drying was carried out for one day and night to remove the moisture, and then the mixed powder obtained was calcined at 1000 to 1100° C., thus obtaining a calcined powder of each composition.

Next, using each calcined powder, a cylindrical molded body was manufactured by pressing such that the size after firing would be diameter 7 mm×height 10 mm, and then the molded body was fired at 1150° C. for 4 hours in atmospheric air.

The fired body was analyzed as in Example 1, whereupon it was confirmed that the fired body was a novel mixed oxide in which the Sc sites of the Sc$^{3+}{}_2$ (W$^{6+}$O$_4$)$_3$ of Evans et al. have been substituted with prescribed ions.

Moreover, the thermal expansion coefficient of the fired body obtained was measured as in Test Example 1. The results are shown in Table 5. It can be seen from Table 5 that the thermal expansion coefficient is very low at 300° C., 500° C. and 700° C.

TABLE 5

Results of measurement by TMA
(Hf)(Mg$_y$Ca$_{1-y}$)(WO$_4$)$_3$ (y = 0, 0.25, 0.5, 0.75, 1.0)
Base: Temperature at start of measurement (room temperature),
length of sample: 10 mm

| Temperature (° C.) | y = | | | | |
|---|---|---|---|---|---|
| | 0 | 0.25 | 0.50 | 0.75 | 1.0 |
| | Thermal expansion coefficient ×10$^{-6}$ (1/K) | | | | |
| 300 | +0.02 | −1.06 | −0.66 | −0.85 | −0.93 |
| 500 | −1.25 | −1.36 | −0.55 | −0.23 | −0.85 |
| 700 | −0.88 | −0.56 | +0.24 | +0.06 | −0.63 |

Table 5 only shows the results of measurement at the three temperatures 300° C., 500° C. and 700° C., but analogizing from the results shown in FIG. 2, Table 2 and Table 3, it is believed that there are no sudden changes in the thermal expansion coefficient within the above temperature region. It is thus clear that the thermal expansion coefficient will be very low as with the results shown in Table 5 at all temperatures from room temperature to 700° C.

With the oxides shown in Examples 1 to 4, the bivalent metallic element Mg or Ca, or a mixture thereof, has been used as M, but Sr, Ba or Ra may also be used. Moreover, in Examples 1 to 4, W has been used as Q, but Mo may also be used. Considering the crystal structures of these metallic elements, it can easily be inferred that a low thermal expansion characteristic would again be obtained as in Examples 1 to 4.

INDUSTRIAL APPLICABILITY

The low thermal expansion materials of the present invention can be widely used in fields in which low thermal expansion is required, predominantly optical jigs, high-frequency dielectrics, and the like.

In the case of using a low thermal expansion material of the present invention in an optical jig, the material can be suitably used, for example, as a mount for supporting lenses.

Such a mount is used in a state interposed between the cylinder and the outer periphery of each of a plurality of lenses provided on an optical jig having a light source. In addition to the light from the light source being incident on the lenses, heat discharged from the light source is also transmitted to the lenses. In this case, lenses closer to the light source receive more heat. In the case of using a conventional material as the mount, the mount will expand due to the heat, causing a shift in the focal points of the lenses, resulting in image distortion. In contrast, if a low thermal expansion material of the present invention is used as the mount, then even if heat is transmitted from the light source, shifting of the focal points of the lenses can be suppressed or prevented, and hence images can be obtained with higher precision.

Moreover, in the case that a low thermal expansion material of the present invention is used as a high-frequency dielectric, this high-frequency dielectric can be used, for example, in any of various devices such as a resonator, a filter, an antenna, or a non-radiating dielectric waveguide. In high-frequency circuits, in general the resonator shape is determined from the size of the dielectric constant, and then the dielectric device is molded and used. However, if the shape of the dielectric changes through thermal expansion, then the resonance frequency will change, which may hamper the circuit characteristics. As frequencies are increased in radio communication technology, it is desirable to reduce the rate of change in the resonance frequency, and a rate of change of a few ppm/K or less is now required. In this case, if a low thermal expansion material of the present invention is used, then this requirement can be met. That is, with a material of the present invention, even if the device is subjected to heat through changes in the environment outside, or in an automobile, or the like, changes in the resonance frequency can be suppressed or prevented, and hence desired characteristics consistent with the circuit design can be obtained reliably.

The invention claimed is:

1. A low thermal expansion material having a thermal expansion coefficient in a range of −3×10$^{-6}$/K to +3×10$^{-6}$/K, excluding zero, within a temperature range from 300 to 700° C. consisting essentially of a crystalline body represented by a compositional formula RM(QO$_4$)$_3$, wherein R represents at least one selected from a group consisting of Zr and Hf, M represents at least one selected from a group consisting of Mg, Ca, Sr, Ba and Ra, and Q represents at least one selected from a group consisting of W and Mo.

2. The low thermal expansion material according to claim 1, wherein R represents Hf.

3. The low thermal expansion material according to claim 1, wherein R represents Zr.

4. The low thermal expansion material according to claim 1, wherein R represents a mixture of Zr and Hf.

5. The low thermal expansion material according to claim 1, wherein M represents Mg.

6. The low thermal expansion material according to claim 1, wherein M represents a mixture of Mg and at least one selected from a group consisting of Ca, Sr, Ba and Ra.

7. The low thermal expansion material according to claim 1, wherein M represents a mixture of Mg and Ca.

8. The low thermal expansion material according to claim 1, wherein Q represents W.

9. The low thermal expansion material according to claim 1, wherein Q represents Mo.

10. The low thermal expansion material according to claim 1, wherein R represents Hf, and M represents Mg.

11. The low thermal expansion material according to claim 10, wherein Q represents W.

12. The low thermal expansion material according to claim 1, wherein R represents a mixture of Zr and Hf, and M represents Mg.

13. The low thermal expansion material according to claim 12, wherein Q represents W.

14. The low thermal expansion material according to claim 1, wherein R represents Hf, and M represents a mixture of Mg and at least one selected from a group consisting of Ca, Sr, Ba and Ra.

15. The low thermal expansion material according to claim 14, wherein Q represents W.

16. The low thermal expansion material according to claim 14, wherein M represents a mixture of Mg and Ca.

17. The low thermal expansion material according to claim 16, wherein Q represents W.

18. The low thermal expansion material according to claim 1, wherein the crystal system of the crystalline body is an orthorhombic system.

19. The low thermal expansion material according to claim 1, having a negative thermal expansion coefficient.

20. The low thermal expansion material according to claim 19, having a thermal expansion coefficient of at least $-3\times10^{-6}$/K but less than $0\times10^{-6}$/K.

21. An optical jig comprising the low thermal expansion material according to claim 1.

22. A high-frequency dielectric comprising the low thermal expansion material according to claim 1.

23. The low thermal expansion material according to claim 1, wherein the temperature range is from 50 to 950° C.

* * * * *

UNITED STATES PATENT AND TRADEMARK OFFICE
CERTIFICATE OF CORRECTION

| | |
|---|---|
| PATENT NO. | : 7,049,257 B2 |
| APPLICATION NO. | : 10/885950 |
| DATED | : May 23, 2006 |
| INVENTOR(S) | : Atsushi Omote et al. |

It is certified that error appears in the above-identified patent and that said Letters Patent is hereby corrected as shown below:

Column 13, Line 5, change "$0 \times 10^{-6/}K$" to -- $0 \times 10^{-6}/K$ --

Signed and Sealed this

Twenty-seventh Day of March, 2007

JON W. DUDAS
*Director of the United States Patent and Trademark Office*